United States Patent [19]

Wagner

[11] 4,208,232

[45] Jun. 17, 1980

[54] METHOD OF PREPARING ACTIVATED CARBON FOR FLOW IN A VACUUM

[75] Inventor: Norman J. Wagner, Pittsburgh, Pa.

[73] Assignee: Calgon Corporation, Pittsburgh, Pa.

[21] Appl. No.: 915,833

[22] Filed: Jun. 15, 1978

[51] Int. Cl.$^2$ ................................................ B32B 1/06
[52] U.S. Cl. ................... 156/276; 29/455 R; 53/432; 156/285; 220/422
[58] Field of Search ............... 29/455 R; 53/408, 432; 215/13 R; 220/420, 421, 422; 428/35, 72; 156/285, 286, 287, 276

[56] References Cited

U.S. PATENT DOCUMENTS

| | | | |
|---|---|---|---|
| 1,071,817 | 9/1913 | Stanley | 220/422 |
| 1,589,088 | 6/1926 | Anthon | 220/422 |
| 2,284,551 | 5/1942 | Alexander | 53/432 X |
| 3,156,975 | 11/1964 | Shaw | 53/432 X |
| 3,245,195 | 4/1966 | Shaw | 53/432 X |
| 3,828,960 | 8/1974 | Walles | 215/13 R |
| 3,916,048 | 10/1975 | Walles | 428/35 |
| 3,921,844 | 11/1975 | Walles | 428/35 X |
| 3,993,811 | 11/1976 | Walles | 215/13 R X |

Primary Examiner—Henry F. Epstein
Attorney, Agent, or Firm—Mario A. Monaco; Martin L. Katz; Edmunde D. Riedl

[57] ABSTRACT

Insulation members having spaced apart walls, and at least a partial vacuum in the chamber defined by the walls are filled with activated carbon. The filling is accomplished under vacuum conditions, and activated carbon, degassed and having a density of greater than 0.3 grams/cm$^3$ is employed to at least partially fill the chamber.

3 Claims, No Drawings

METHOD OF PREPARING ACTIVATED CARBON FOR FLOW IN A VACUUM

DISCLOSURE OF THE INVENTION

This invention relates to methods of filling insulating members employed for maintaining temperature of an enclosed space at a desired level. More particularly, it relates to methods of filling an insulating means suitable for inclusion in refrigeration devices, and particularly in food service containers both to maintain heated or cooled conditions. This invention especially relates to methods of filling insulation means adopted for use in double walled vacuum bottles and more precisely, Dewar flasks. Even more particularly, this invention is concerned with vacuum bottles constructed of plastic materials wherein the vacuum chamber is at least partially filled with activated carbon having a density greater than 0.3 grams/cubic centimeter.

The double walled vacuum insulating member employed in the Dewar flask is probably the best known and widely used thermal insulation means for containers. Heat transfer can occur only by conduction through the elements supporting the insulating member, conduction by any residual gas due to imperfect evacuation, and by radiation. Good design minimizes heat transfer by most of these routes, but the choice of materials that can be employed has largely limited the application to rather small containers of silvered glass or metal. More recently, plastic materials are being substituted for the glass or metal materials and are a substantial advance since they can be blow molded they therefore are more economical, and further compared to silvered glass, breakage hazards are less. This latter advantage is especially important when vacuum bottles are intended for use by children. At the present for safety reasons, plastic bottles are employed, but they only employ foamed or other insulation and are ineffective for much longer than a few hours.

Examples of advances in vacuum containers of plastic are shown in U.S. Pat. Nos. 3,921,844; 3,828,960; and 3,916,048.

However, to be an effective commercial substitute for the present vacuum containers it is essential that a high volume of production should be maintained. Thus, problems associated with making these insulating members in sufficient quantities at sufficient speed to justify substitution of materials must be overcome before the inherent economics of the more sturdy plastic vacuum bottles can be generally made available.

The difficulty in mass production of vacuum containers having the evacuated chamber filled with activated carbon is that if the activated carbon is introduced into the container at atmospheric pressures elaborate steps must be taken to later establish a vacuum. One known method is to fill the chamber with carbon dioxide gas and a reactant material such that a chemical reaction ensues and the carbon dioxide gas is consumed subsequent to sealing the container. Another technique is to fill the chamber with the activated carbon, apply a vacuum to the chamber and when the chamber adequately is evacuated, seal the chamber. Unfortunately, this latter procedure takes an inordinate amount of time since the void volume of the activated carbon is only slowly evacuated or degassed. Heating accelerates the process, but excessive heat can deform or damage the plastic housing.

External heating and degassing of the activated carbon prior to filling the vacuum chamber is found preferable. Unfortunately, when the activated carbon is heated and degassed, efforts to transfer degassed activated carbon from an evacuation vessel to the evacuated vacuum chamber without the impetus of a gas stream are exceptionally difficult and the sluggish flow is not adaptable to line production.

Of course, introduction of a gas stream to induce flow is not feasible in the evacuated system without destroying the vacuum. Now it is found that activated carbon having a density of in excess of 0.3 and preferably in excess of 0.65 grams/centimeter$^3$ after degassing according to this invention flows rapidly and without immpedance under vacuum.

Those activated carbons suitable for use as the gas scavengers of this invention, most suitably have an air of capacity of greater than 0.21 cc./g. at 0.5 torr. Those activated carbons available from Calgon Corp. designated types PCN; PCB; AFC-2204; and BPL have air capacities of about from 0.40 cc./g. It is also found that iodine number can be employed as a quality control tool to insure adequate air capacity. Activated carbons having iodine numbers in the range 500–550 show preferred air capacities.

The mesh size of the activated carbon can suitably fall in the range 200×500 U.S. Sieve Series. Measurements of thermal conductivity indicate that desirable insulating properties are provided when the activated carbon is pulverized to a mesh size in the range of 200×500 U.S. Sieve Series. Fillers such as gyrolite (a diatomaceous earth) and even powdered iron when admixed with the above-preferred activated carbons are found to inhibit infrared radiation further suppressing the thermal conductivity and improving the insulating properties of the activated carbon. Pulverized anthracite was found to have a low thermal conductivity making it acceptable as an inexpensive diluent for high air capacity activated carbons. These diluents can be employed from 0% to 80% by weight of the activated carbon.

Additionally, it is found especially advantageous to include with the activated carbon a fumed silica in an amount of from 0.5% to 1.5% by weight and preferably 1% by weight of the activated carbon and intimately admixed therewith. The fumed silica on a dry basis is 99% by weight silicon dioxide, and is sold under the name CAB-O-SIL, a registered trademark of the Cabot Corp., Boston, Mass. The silicon dioxide selected can have a surface area in the range of from 175 to 420 meters$^2$gram, and should most suitably fall within the same particle size range as the activated carbon.

In preparing the activated carbon for filling insulation chambers of the type herein referred to, the activated carbon optionally including the fused silica is first sized to the desired mesh. Then, the sized activated carbon is dried by any suitable means, such as passing a low humidity gas stream over or through the activated carbon. The gas stream can consist of methane, nitrogen, or other inert gases such as helium or argon. The drying of the activated carbon can further be accelerated by heating to a temperature of 25° C.–150° C., although heating in excess of 150° C. is highly undesirable. One suitable means is to employ a drum dryer and tumble the activated carbon in a heated gas stream. Usually, after drying is complete, the activated carbon has a moisture content of less than 0.1% by weight. Generally, a moisture content much in excess of about 1% is considered unsatisfactory. After drying, the activated carbon is heated to a temperature of from 100° C.–350° C., further prior to the degassing step. Although this additional heating can be accomplished concurrently with degassing, it is generally desirable to heat the activated carbon to this temperature prior to commencing degassing.

In this heating step, the dried activated carbon is most desirably heated to a temperature of 150° C. to 350° C. It is convenient to employ the same apparatus that is employed to accomplish the degassing to facilitate handling of the activated carbon.

If heating is accomplished externally to the means employed to degas the activated carbon, the activated carbon is transferred to the degassing means and degassed while hot. Temperatures in excess of 350° C. are allowable, but not desirable, and temperatures in excess of 1000° C. are detrimental to the activated carbon.

In the degassing means, a vacuum is applied by any suitable means so that gases adsorbed on the activated carbon are removed. A vacuum is pulled on the degassing means by aspiration, or a pump means. The vacuum level in the degassing means is at least as great as the vacuum desired in the insulation chamber or vacuum bottle. Degassing is deemed complete when that desired vacuum level is reached. Generally, this is 1 mm./Hg. or less. Then the degassing means and its contents are cooled to a temperature that is below the temperature that would be deliterious to the plastic housing of the insulating member or any gas impermeable lining applied to the walls of the insulation member. A transfer means comprising a suitable connection, e.g., a line of polyethylene between the interior of the degassing means and the evacuated insulation bottle, the activated carbon is fed by gravity into the interior of the vacuum chamber. Mechanical vibration can be suitably employed to further accelerate filling of the void space in the insulation chamber. During this filling procedure the degassing means, the transfer means, e.g., polyethylene tubing, and the insulation chamber of the vacuum bottle are all evacuated. After filling, the insulation member is pinched off and sealed by means known in the art. The vacuum is still maintained in the degassing means and the connection means as the insulation member of a new bottle is evacuated and moved into position for filling. In this manner, a production quantity of vacuum chambers can rapidly be filled.

What is claimed is:

1. A method of filling plastic insulation members while the members are maintained under a vacuum comprising drying an activated carbon having an air capacity of greater than 0.21 cc./g. at 0.5 torr, a mesh size of 200×500 U.S. Sieve Series., and a density greater than 0.3 grams/cm$^3$ to a moisture content of less than 1% by weight wherein the activated carbon is dried by passing an inert gas stream over said activated carbon, said drying is conducted by heating the activated carbon to a temperature of 25° C.–150° C.; after drying, further heating said activated carbon to a temperature of 100° C.–350° C.; degassing the activated carbon by applying a vacuum to said activated carbon until the vacuum level applied to the activated carbon is essentially equivalent to the vacuum level in the evacuated insulation member and filling the insulation member with the degassed activated carbon.

2. A method according to claim 1 where said gas is helium.

3. A method according to claim 1 where the bulk density of said activated carbon is greater than 0.65 g./cm$^3$.